May 12, 1959 R. W. GILBERT 2,886,751
ELECTRO-MECHANICAL RESOLVER
Filed Oct. 8, 1956 3 Sheets-Sheet 1
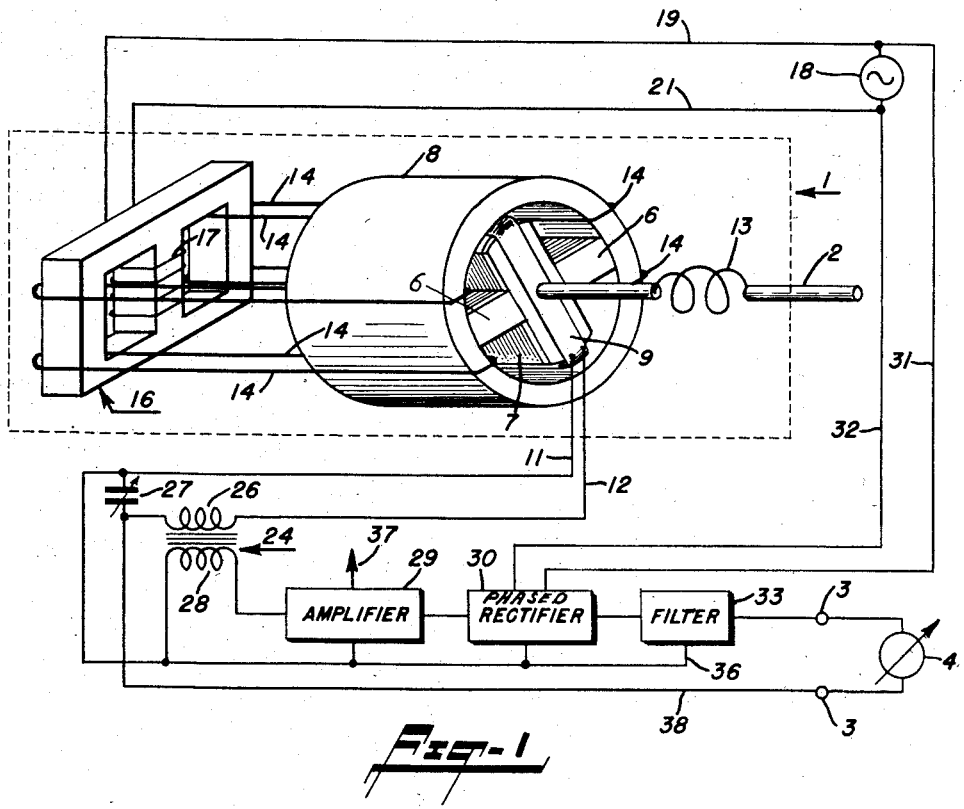
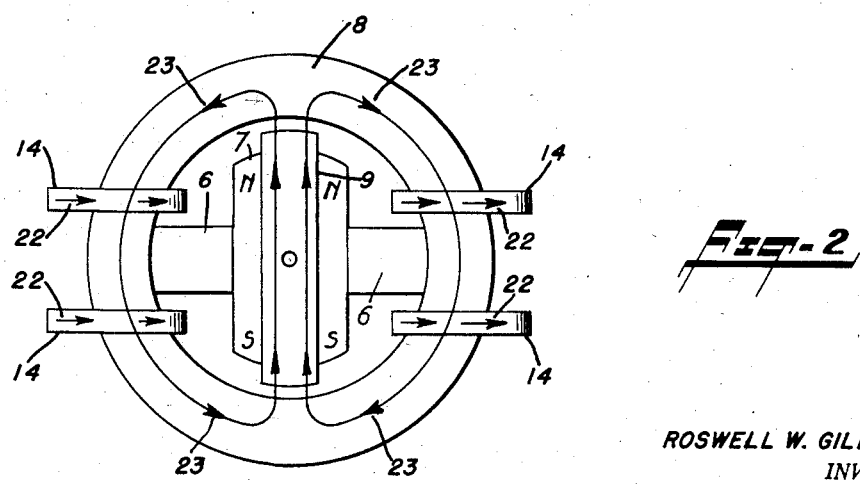
ROSWELL W. GILBERT
INVENTOR.

May 12, 1959

R. W. GILBERT 2,886,751

ELECTRO-MECHANICAL RESOLVER

Filed Oct. 8, 1956

ROSWELL W. GILBERT
INVENTOR.

BY
Rudolph J. Hunick
ATTORNEY

May 12, 1959
R. W. GILBERT
2,886,751
ELECTRO-MECHANICAL RESOLVER
Filed Oct. 8, 1956
3 Sheets-Sheet 3
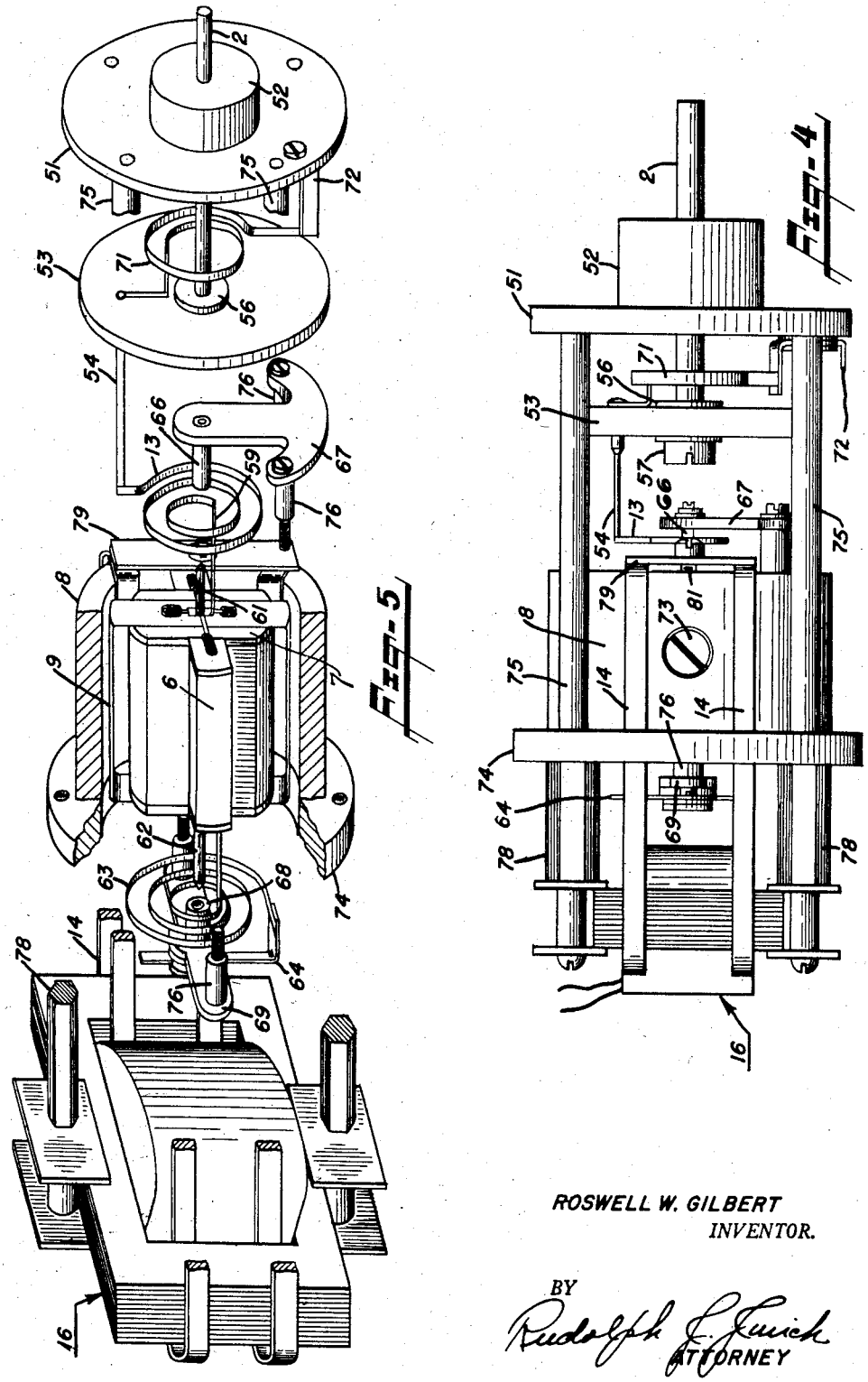
ROSWELL W. GILBERT
INVENTOR.
BY
Rudolph J. Jurick
ATTORNEY United States Patent Office 2,886,751
Patented May 12, 1959

2,886,751

ELECTRO-MECHANICAL RESOLVER

Roswell W. Gilbert, Montclair, N.J., assignor, by mesne assignments, to Daystrom, Incorporated, Murray Hill, N.J., a corporation of New Jersey Application October 8, 1956, Serial No. 614,569

15 Claims. (Cl. 318—28)

This invention relates to an electro-mechanical resolver and more particularly to a novel arrangement wherein either a relative shaft position may be converted to an output current which varies as a function of the relative shaft position, or conversely, wherein an input current may be converted to a relative shaft position which varies as a function of the input current.

The electro-mechanical resolver mechanism of this invention has two distinct, yet related, applications; one application being the reverse of the other. In a first novel electrical arrangement in which the resolver finds use, the mechanism is employed as a current to position resolver. With this arrangement, a direct-current input to the resolver mechanism is converted to a relative shaft position wherein the degree and direction of rotation of the shaft is a function of the magnitude and polarity, respectively, of the input current. In a second novel electrical arrangement, the resolver mechanism is employed as a position to current resolver. With this arrangement, the position of a rotatable shaft, relative to a normal zero position, is converted to a direct-current output of a magnitude and polarity which is a function of the input shaft direction and degree of rotation, respectively.

One practical application for my novel electrical circuit arrangement wherein the device is utilized as a current to position resolver, is in a recorder system wherein a permanent record of a varying D.-C. current is desired. The output shaft of the current to position resolver arrangement may be used to drive a stylus or drum in the recording mechanism. An application of the electrical circuit arrangement involving the use of my novel device as a position to current resolver mechanism is in an analog computer system where an output current which is a function of a shaft position is desired. Numerous other applications for my novel resolver circuit arrangements will occur to those skilled in this art.

An object of this invention is the provision of an electrical apparatus comprising a composite fixed and varying magnetic flux field, a coil rotatable in said composite fixed and varying magnetic flux field, a rotatable input shaft resiliently connected to the said coil for applying a torque thereto, and means automatically applying a D.-C. current to the said coil to produce an equal and opposite torque in the said coil, the magnitude of the D.-C. current being a function of the said input shaft position.

An object of this invention is the provision of an electrical apparatus for converting a D.-C. input current to a relative shaft position which is a function of the said D.-C. input current magnitude and polarity, said apparatus comprising a composite fixed and varying magnetic flux field, a coil rotatable in said composite fixed and varying magnetic flux field, a resilient coupling connected to the said coil, means applying a D.-C. current to the said coil whereby a torque is applied to the said coil in one direction, and means including a rotatable shaft for automatically applying an equal and opposite restoring torque to the said coil through the said resilient coupling, the degree and direction of rotation of the said rotatable shaft necessary to produce a restoring torque capable of holding the said coil against movement being an indication of the magnitude and polarity of the said D.-C. current.

An object of this invention is the provision of an instrument mechanism comprising a base, a shaft rotatably mounted on the said base, a rotatably mounted coil resiliently connected to the said shaft, a cylindrical-shaped magnetic structure supported from the said base and surrounding the said coil, a permanent magnet mounted within the said cylindrical-shaped magnetic structure whereby a uni-directional magnetic flux field is established through the said coil, and a pair of windings extending longitudinally of the said cylindrical-shaped magnetic structure and surrounding a wall thereof, the said windings adapted to be energized by an A.-C. current whereby a cyclically-varying magnetic flux field is introduced into the stationary magnetic flux field.

These and other objects and advantages will become apparent from the following description when taken with the accompanying drawings. It will be understood that the drawings are for purposes of illustration and are not to be construed as defining the scope or limits of the invention, reference being had for the latter purposes to the appended claims.

In the drawings wherein like reference characters denote like parts in the several views:

Figure 1 is a diagrammatic presentation of my electro-mechanical resolver as applied to a system for obtaining an output current which is a function of a shaft position;

Figure 2 is an end view of the magnetic structure (including the rotatably mounted coil) of my resolver and illustrates the manner in which a varying magnetic flux field is induced in the magnetic flux gap within which the coil rotates;

Figure 4 is a side view showing the actual construction of my electro-mechanical resolver; and Figure 5 is an exploded perspective view of the resolver mechanism shown in Figure 4.

Figure 3:
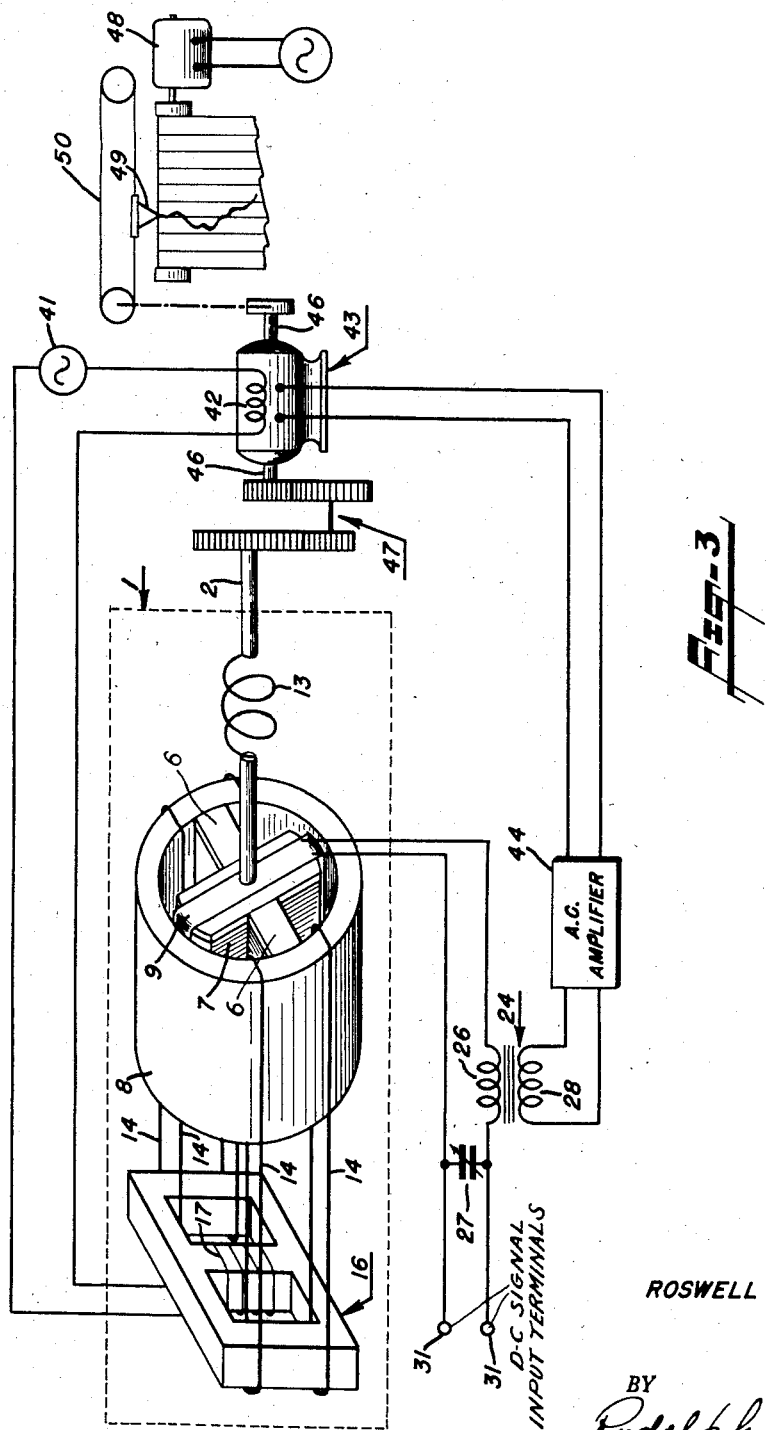
Figure 3 is a diagrammatic presentation of my invention as applied to a system for obtaining a shaft position which is a function of an input current.

Referring to Figure 1 of the drawings, reference numeral 1 designates, generally, my electro-mechanical resolver as utilized in a position to current resolver system wherein the position of a shaft 2 determines the magnitude and polarity of a D.-C. output current at the output terminals 3. As shown in the drawing, an ammeter 4 may be connected across the output terminals 3 to give an indication of the output current; however, any desired load may be connected to the output terminals to utilize the systems output current.

The position to current resolver 1 is, essentially, a permanent magnet, movable coil instrument structure but including means for injecting an A.-C. component of magnetic flux into the permanent field flux path. The normal, constant magnetic flux is provided by a permanent magnet 7 secured within a cylindrical, soft-iron, yoke 8 by means of non-magnetic spacer members 6, 6. A wire-wound movable coil 9 is pivotally mounted for rotation in the magnetic flux gap formed between the magnet 7 and the yoke 8, electrical connection being made to the coil through the leads 11 and 12. The shaft 2 is resiliently connected to the coil 9 through a coil spring 13, or any other suitable resilient coupling member.

A varying magnetic flux field is produced by four windings 14 which encircle the walls of the cylindrical-shaped magnetic structure 8, and extend in a generally longitudinal direction therewith. The windings 14 constitute, also, the secondary windings of a transformer 16 which is provided with a primary winding 17 energized by an appropriate alternating current source 18 through the leads 19 and 21. It may here be noted that a device which utilizes a permanent magnet movable coil instrument which includes means for injecting an A.-C. component of magnetic flux into the permanent field flux path is shown in my United States Patent entitled Measuring and Control Apparatus, Number 2,486,641, which was issued November 1, 1949.

Reference is now made to Figure 2 of the drawings which shows an end view of the movable coil 9 and the instruments magnetic structure. Figure 2 illustrates how the varying magnetic flux field is induced in the magnetic flux gap within which the movable coil 9 rotates. The polarity of the windings 14 is such as to result in a relative instantaneous direction of current flow in the windings as illustrated by the arrowheads 22. A corresponding magnetic flux is produced in a direction shown by the arrows 23, which magnetic flux crosses the air gap between the poles of the permanent magnet 7 and the cylindrical-shaped yoke 8. The magnetic flux in the air gap is continuously changing direction because the windings 14 are energized with an alternating current. It is apparent, then, that the movable coil 9 rotates in a magnetic flux gap that includes the steady flux field of the permanent magnet 7 and the varying flux field produced by the windings 14.

Referring again to Figure 1 of the drawings, when the movable coil is in its normal zero-center position, the A.-C. field flux linkage is zero. However, an angular deflection of the coil 9 upon rotation of the shaft 2 (through the spring 13), or in response to the flow of direct current therethrough, causes the coil to link the A.-C. component of magnetic flux, and an A.-C. component of potential having a magnitude proportional to the degree of deflection of the coil is induced in the coil. Thus, deflection of the coil in response to a torque applied to the coil will produce an A.-C. potential which can be extracted by the external circuit as by means of a transformer 24.

The A.-C. output from the movable coil 9 is applied to the input winding 26 of the transformer 24. A capacitor 27 is included in the transformer input circuit, which capacitor serves to tune the transformer 24 whereby the position/current resolver may be adjusted to the point of maximum sensitivity. The transformer A.-C. output is taken from the transformer secondary winding 28 and fed to an amplifier 29. The amplifier output is fed to a phased rectifier 30 where the A.-C. signal is converted to a D.-C. signal current. In order to obtain a proper polarity D.-C. signal current, the rectifier 30 is supplied with a phase-reference voltage from the alternating current source 18 through the leads 31 and 32. The D.-C. signal current is then filtered by the use of a filter 33. The amplifier, rectifier and filter have all been shown in block diagram form as the particular circuitry involved in converting the A.-C. signal from the movable coil 9 to a D.-C. signal current is not important to an understanding of my novel current resolver circuit arrangement. The amplifier, rectifier and filter may be of a conventional design wherein they are all connected to a common ground connection 36 along with the transformer 24 and the movable coil 9; and the amplifier connected to a source of positive potential by means of a lead 37.

The filtered D.-C. signal current from the filter 33 is fed through an ammeter 4 (or any desired useful load), lead wire 38, the transformer primary winding 26 to the movable coil 9; and thence through the movable coil 9 to the common ground connection 36. The D.-C. signal current is fed to the movable coil 9 in a direction to oppose the action of the torque produced by the rotation of the shaft 2. That is, the D.-C. signal current through the movable coil 9 sets up a flux field which reacts with the constant magnetic flux provided by the permanent magnet 7 to, thereby, provide a torque on the movable coil. The polarity of the D.-C. signal is such that the interaction of the constant magnetic flux field provided by the permanent magnet 7 and the flux field established by the flow of D.-C. signal current in the movable coil opposes the torque produced by rotation of the shaft 2 which is coupled to the movable coil through the resilient member 13. The D.-C. signal current thereby torque-balances the coil 9 so as to maintain the coil at substantially normal zero-center position at all times regardless of the amount of torque which is applied to the coil through the spring 13 upon rotation of the shaft 2. The amount of D.-C. signal current necessary to balance the coil 9 is a measure of the degree of rotation of the shaft 2, while the polarity of the D.-C. signal current is an indication of the direction of rotation of the shaft. It may here be noted that the deflection of the movable coil 9 in response to the D.-C. signal current is not adversely affected by the varying magnetic flux field produced by the windings 14 and the resultant induction of an alternating potential which is extracted therefrom by means of the transformer 24. In practice, certain design limitations should be satisfied, e.g., the magnitude of the alternating current excitation field should be limited to a value that will not unduly affect the steady field flux component.

A second, inherent, application of my novel resolver apparatus is illustrated in Figure 3 of the drawings which shows my resolver utilized in a current to position resolver system wherein the polarity and magnitude of a D.-C. input current determines the position of a shaft. Referring to Figure 3, reference numeral 1 again designates my resolver mechanism which is the same as the mechanism shown in Figure 1 of the drawings and described above. In the circuit arrangement of Figure 3, a D.-C. input current, which is applied to the input terminals 31, controls the position of the shaft 2 of the position/current resolver mechanism 1.

An alternating current in the windings 14 produces a varying magnetic flux field within which the coil 9 rotates, similarly to the resolver mechanism described in connection with Figure 1. The primary winding 17 of the transformer 16, which supplies the secondary windings 14 with an alternating current, is connected to an alternating current source 41, which current source is also connected to the field windings 42 of an A.-C. motor 43; the reason for which will become apparent as the description continues.

The D.-C. input current which is connected to the input terminals 31 is fed to the coil 9 through the transformer primary winding 26, and results in torque being produced on the coil 9, thereby causing the coil to rotate; the direction and extent of rotation depending upon the polarity and magnitude, respectively, of the D.-C. input current. That is, the D.-C. input curent in the movable coil 9 sets up a flux field which reacts with the constant magnetic flux provided by the permanent magnet 7 to, thereby, provide a torque on the movable coil. Upon angular deflection of the coil 9, by reason of the application of the D.-C. input current, the coil proportionally links the A.-C. component of magnetic flux, and an A.-C. component of potential having a magnitude and phase proportional to the degree and direction of rotation, respectively, is introduced in the coil 9. The A.-C. potential thus produced may be extracted as by means of the transformer 24. As in the position to current resolver circuit described above and shown in Figure 1, the A.-C. output from the movable coil 9 is applied to the input winding 26 of the transformer 24; the capacitor 27 serving to tune the transformer. The A.-C. signal from the transformer secondary winding 28 is first amplified by an amplifier 44 and then fed to the armature winding (which winding has not been shown) of the A.-C. motor 43, whereupon the motor shaft 46 is caused to rotate; the direction of rotation being dependent upon the phase of the A.-C. current which is fed to the motor armature winding. The motor shaft 46 may be connected to the resolver shaft 2 through suitable gearing 47, as illustrated in Figure 3 of the drawings, or may be directly coupled thereto, if so desired. As in the position to current resolver mechanism of Figure 1, the shaft 2 is connected to the coil 9 through the spring 13. Upon rotation of the motor shaft 46, a torque is produced on the movable coil 9 which is proportional to the degree of rotation of the motor shaft. The torque thus produced balances the torque produced by the D.-C. input current. A torque balance results whereby the coil 9 is maintained at substantially normal zero-center position at all times regardless of the amount of D.-C. input current which is applied to the input terminals 31. Thus it is seen, the degree of rotation of the motor shaft 46 (and the shaft 2) is a function of the magnitude of D.-C. input current.

In Figure 3, a recorder mechanism 48 is shown coupled to the motor shaft 46 whereby the useful system output is taken from the motor shaft 46. The useful system output may be taken from the shaft 2 or gear train 47, as the rotation of these members is a function of the rotation of the motor shaft 46. The recorder mechanism is shown, simply, as including a chart movable at a constant linear speed by suitable mechanism including a synchronous motor 48 and a stylus, or pen, 49 movable along the chart by a suitable cord 50 operating over two pulleys, one of which is mechanically coupled to a pulley carried by the motor shaft 46. Thus, it will be apparent that the movement of the pen will correspond to the magnitude and sense of the input current applied to the movable coil 9 of the resolver unit 1.

It may here be noted that in the resolver arrangement above described, the constant magnetic flux provided by the permanent magnet 7, and the spring constant of the spring 13 provide the two system constants which determine the degree to which the shaft 2 will rotate upon application of any given input current. Many position resolver mechanisms currently used require the use of a standard cell and a calibrated slide wire in order to achieve any degree of accuracy in the systems output. The use of a slide wire and standard cell is undesirable and has been eliminated in my system. The use of my novel electro-mechanical resolver mechanism results in other advantages not to be found in conventional position and/or current resolver mechanisms. In my position to current resolver arrangement, the system may be operated at a high operating frequency, the operating frequency being largely dictated by eddy current loss considerations. With suitable amplifications, reasonably peaked to the operating frequency, feedback periods of the order of milliseconds are readily obtainable. The position to current resolver mechanism operating at standard power frequency has an inherently high conversion gain of the order of about 20 db and delivers a high amplifier input level. It may be seen then, that by use of my novel position to current resolver mechanism in a current resolver arrangement such as illustrated in Figure 1, extremely rapid and accurate resolver operations may be performed. Upon application of a shaft rotation to my current resolver mechanism, the coil 9 returns to substantially normal, zero-center, position in only several milliseconds and the deflection of the coil is in the order of only a few seconds of angle. When my resolver mechanism is used in a current to position resolver arrangement the systems operating frequency will be largely dictated by the A.-C. motor 43 and, of course, low frequencies will be required. However, as mentioned above, my position resolver arrangement is superior to conventional position resolvers because of the elimination of the slide wire and standard cell from the circuit arrangement.

Reference is now made to Figures 4 and 5 which are a side view and an exploded perspective view, respectively, of my novel resolver mechanism showing the structural arrangement thereof. An end structure 51 supports a hub 52 through which the shaft 2 extends. Roller bearings, or any suitable bearing surfaces, support the shaft for rotation within the hub 52. The shaft 2 is connected to the movable coil 9 through a disc 53, an extending pin 54 and the spring 13. The disc, which is made of plastic, or any other suitable material, is provided with a hole therein through which the shaft 2 extends; the disc being held between a flange 56 and a nut 57 threadedly engaging the end of the shaft. The pin 54 is rigidly fastened to the disc 53 by any suitable means and extends in a generally axial direction therefrom. One end of the spiral spring 13 is soldered, or otherwise suitably fastened, to the end of the extending pin 54, while the other end of the spring is suitably fastened to one end of a connecting arm 59. The other end of the connecting arm 59 connects to a stub shaft 61 which stub shaft is securely fastened to the coil 9 and makes electrical connection with one end of the coil winding. The stub shaft 61, along with a second stub shaft 62 at the opposite end of the coil, pivotally support the coil between bearing members 66 and, 68, which in turn, are supported by a T-shaped bridge member 67 and a straight bridge member 69, respectively.

The cylindrical-shaped soft-iron yoke 8, which surrounds the coil 9, is suitably secured to an end plate 74, which in turn is supported from the end structure 51 on a plurality of supporting posts 75. The T-shaped bridge member 67 and the straight bridge member 69 are secured to the cylindrical-shaped yoke 8 and spaced therefrom by means of spacers 76. The permanent magnet 7 is suitably supported inside the cylindrical-shaped magnetic structure 8 on the non-magnetic spacer members 6,6 which are prevented from relative movement therewith by a set screw 73 which threadedly engages the wall of the cylindrical-shaped yoke 8.

One end of a temperature compensating spring 63 is secured to the stub shaft 62 while the other end is secured to an L-shaped abutment member 64. In a manner well known to those skilled in the electrical instrument art, the temperature compensating spring 63 is wound in a direction so as to compensate for the effects of contraction and expansion of the spring 13 upon temperature changes, with the result that the coil 9 remains stationary with temperature change. It will be noted that the spring 13 and temperature compensating spring 63 constitute part of the electrical circuit through which electrical connection is made to the coil 9 as is common practice in this art. For this reason the bearing members 66 and 68, as well as the L-shaped abutment member 64, are insulatedly supported on the bridge members 67 and 69, respectively. Electrical contact is made from one end of the coil 9 to the stub shaft 62; to the temperature compensating spring 63, to the L-shaped abutment member 64 and thence to the external circuit. Electrical contact from the other end of the coil is made to the stub shaft 61, through the connecting arm 59 to the spring 13, and from the spring 13 to the extending pin 54. A connection 72, insulatedly supported on the end member 51, is connected to the end of the extending pin 54 through the spring 71 and provides the electrical connection to the external circuit.

By making the bridge member 67 of a generally T-shape, rotation of the shaft 2 through an angle of somewhat less than 360 degrees is obtainable. Abutting of the extending pin 54 on the upright portion of the bridge 67 defines the range of movement of the extending pin 54 and so also the shaft 2. A large angle through which the shaft 2 may rotate is desirable in that a spring 13 having a relatively small stiffness constant may be employed. Accuracy of the mechanism is increased with an increased shaft rotation to input current necessary to maintain a coil balance. The tension of the nut 57 on the end of the shaft 2 is adjusted so that if the shaft is turned past the stops defined by the upright portion of the bridge 67, the shaft 2 will slip in the disc 53 with no resulting damage to the mechanism.

The transformer 16 which is used in setting up a varying magnetic flux field in the instrument is supported on a pair of posts 78 which are fastened to the end plate 74. The transformer secondary windings 14 comprise four rigid, single turns of wire capable of carrying several amperes of current. The secondary windings are supported by plates 79 made of non-magnetic material which are attached to the end of the cylindrical-shaped magnetic structure 8 as by screws 81. The windings 14 are electrically insulated from all metallic structure by either spacing the windings a distance therefrom or by placing insulation therebetween.

My novel electro-mechanical resolver mechanism provides design and performance optimums which are not usual in ordinary devices of this type. Two advantages which have not been previously mentioned are: (1) the small deflection angle of the coil 9 allows concentration of the permanent magnetic flux field to a high density, and (2) the alternating component of torque reduces friction to an undetectable order, allowing pivot and jewel bearing at sensitivities normally requiring a suspension design.

Having now described my invention in detail in accordance with the patent statutes, various changes and modifications will suggest themselves to those skilled in this art, and it is intended that such changes and modifications shall fall within the spirit and scope of the invention as recited in the following claims.

I claim:

1. An electro-mechanical resolver comprising a composite fixed and varying magnetic flux field, a coil rotatable in the said composite fixed and varying magnetic flux field, a rotatable input shaft resiliently connected to the said coil for applying a torque thereto, and means automatically applying a D.-C. current to the said coil to produce an equal and opposite torque to the coil, the amount of the said D.-C. current being a function of the angular position of the said rotatable input shaft.

2. An electro-mechanical resolver comprising a permanent magnet for establishing a fixed magnetic flux field, means injecting a varying component of magnetic flux field into the said fixed magnetic flux field, a coil rotatable in the fixed magnetix flux field, a rotatable input shaft resiliently connected to the said coil for applying a torque thereto in one or the other direction, means automatically applying a D.-C. current to the said coil to oppose movement thereof by the shaft, the amount of D.-C. current applied to the said coil to substantially hold the coil against movement being an indication of the angular position of the said rotatable input shaft.

3. An electrical apparatus comprising a composite fixed and varying magnetic flux field, a coil rotatable in the said composite fixed and varying magnetic flux field, a rotatable input member resiliently attached to the said coil whereby a torque is applied to the said coil upon rotation of the rotatable input member, means sensing the A.-C. potential induced in the said coil by reason of the said varying magnetic flux field, means converting the said A.-C. potential to a D.-C. current, means applying the said D.-C. current to the said coil to oppose movement thereof, the amount of D.-C. current applied to the coil to hold the coil against movement upon rotation of the said rotatable input member being a function of the degree of rotation of the rotatable input member.

4. An electrical apparatus for converting a relative shaft position to a D.-C. current which is a function of the relative shaft position, means comprising a permanent magnet for establishing a fixed magnetic flux field, means injecting a varying component of magnetic flux into the said fixed magnetic flux field, a coil rotatably suspended about the said permanent magnet, means including a rotatable shaft resiliently coupled to the said coil for applying a torque to the coil in one direction, means applying a D.-C. current to the said coil to oppose movement thereof in the said one direction, and means regulating the said D.-C. current, said means including an A.-C. potential induced in the said coil upon deflection of the coil by reason of the said varying component of magnetic flux, the amount of D.-C. current applied to the said coil to hold the coil against movement being a function of the position of the said rotatable input shaft.

5. An electrical apparatus comprising a composite fixed and varying magnetic flux field, a coil rotatably positioned in the said composite fixed and varying magnetic flux field about an axis extending through the coil, an input member resiliently connected to the said coil for applying a torque thereto, which torque is adapted to rotate the coil from a normal zero-center position, means applying a D.-C. current to the said coil whereby an opposing torque is applied to the coil, which torque tends to return the said coil to the said normal zero-center position, means including an A.-C. potential induced in the said coil by reason of the varying magnetic flux field for adjusting the amount of the said D.-C. current, the amount of D.-C. current necessary to maintain the said coil at substantially normal zero-center position being a function of the said input shaft position.

6. An electrical apparatus comprising a permanent magnet for establishing a stationary magnetic flux field; means injecting an A.-C. component of magnetic flux into the said stationary magnetic flux field; a coil in the said stationary magnetic flux field and rotatable about an axis extending through the said permanent magnet; a rotatable member resiliently coupled to the said coil whereby a torque is applied to the coil upon rotation of the said rotatable member; means counter-balancing the torque which is applied to the said coil upon rotation of the said input member, said means including a D.-C. current regulated by an A.-C. potential induced in the said coil by reason of the said A.-C. component of magnetic flux, the amount of D.-C. current being a measure of the position of the said rotatable member.

7. An electrical position resolver mechanism comprising a composite fixed and varying magnetic flux field, a coil rotatable in the said composite fixed and varying magnetic flux field, a resilient coupling member connected to the said coil, means applying a D.-C. current to the said coil whereby a torque is applied to the said coil in one direction, means automatically rotating the said resilient coupling member whereby an equal and opposite restoring torque is applied to the coil through the said resilient coupling member, the amount of rotation of the resilient coupling member necessary to produce the said restoring torque being a function of the magnitude of the said D.-C. current.

8. An electrical apparatus comprising a permanent magnet for establishing a fixed magnetic flux field, means injecting a varying component of magnetic flux field into the said fixed magnetic flux field, a coil rotatable about an axis through the said permanent magnet, a resilient coupling member connected to the said coil, means applying a D.-C. current to the said coil whereby an initial torque is applied to the coil in one direction, means automatically applying a restoring torque to the said coil through the said resilient coupling member to substantially hold the coil against movement by the said initial torque, the amount of restoring torque being a function of the amount of the said D.-C. current.

9. An electrical mechanism comprising a composite fixed and varying magnetic flux field, a coil rotatable in the said composite fixed and varying magnetic flux field, a resilient coupling connected to the said coil, a D.-C. input current connected to the said coil whereby a torque is applied to the coil, means sensing the A.-C. potential induced in the coil by reason of the said varying magnetic flux field, means converting the said A.-C. potential to a shaft rotation, means applying the said shaft rotation to the said resilient coupling member thereby creating a restoring torque on the coil, the degree and direction of the said shaft rotation being a function of the magnitude and polarity of the said D.-C. input current.

10. An electrical apparatus comprising a permanent magnet for establishing a fixed magnetic flux field; means injecting a varying component of magnetic flux into the said fixed magnetic flux field; a coil rotatable in the said fixed magnetic flux field; a resilient coupling member connected to the said coil; a D.-C. input current source connected to the said coil whereby a torque is applied to the coil, the magnitude and direction of the torque being determined by the magnitude and polarity, respectively, of the D.-C. input current source; means rotating the said resilient coupling member whereby an opposite torque is applied to the said coil; means regulating the amount of rotation of the said resilient coupling member, said means including an A.-C. potential induced in the said coil, upon deflection of the coil, by reason of the said varying component of magnetic flux, the amount and direction of rotation of the said resilient coupling necessary to substantially hold the said coil against movement upon application of the said D.-C. input current being a function of the magnitude and polarity of the D.-C. input current.

11. An electrical apparatus for converting a D.-C. input potential to a relative motor shaft position which is a function of the said D.-C. input potential, said apparatus comprising a composite fixed and varying magnetic flux field; a coil rotatably positioned in the said composite fixed and varying magnetic flux field about an axis extending through the said coil, said coil being connected to a source of D.-C. input potential whereby a torque is applied to the said coil, which torque tends to rotate the coil from a normal zero-center position; a motor having a rotatable shaft resiliently coupled to the said coil through a resilient coupling member; means including an A.-C. potential induced in the said coil by reason of the said varying magnetic flux field for energizing the said motor whereby an opposing torque is applied to the coil through the said resilient coupling member, which opposing torque tends to return the said coil to the said normal zero-center position, the degree of rotation of the said motor rotatable shaft being a function of the magnitude of the said D.-C. input potential.

12. An electrical apparatus for converting a D.-C. input potential to a motor shaft position which is a function of the said D.-C. input potential, said apparatus comprising a permanent magnet for establishing a stationary magnetic flux field; means injecting a varying component of magnetic flux into the said stationary magnetic flux field; a coil in said stationary magnetic flux field and rotatable about an axis extending through the coil; a source of D.-C. input potential connected to the said coil whereby a torque is applied to the coil; a resilient coupling member connected to the said coil; means including a rotatable motor shaft connected to the said resilient coupling member for producing an equal and opposite torque on the said coil, said means being regulated by an A.-C. potential induced in the said coil by reason of the said varying component of magnetic flux, the degree and direction of rotation of the said rotatable motor shaft being a function of the magnitude and polarity, respectively, of the said D.-C. input potential.

13. An instrument mechanism comprising an end member; a shaft rotatably mounted on the said end member; a rotatably mounted coil resiliently connected to the said shaft; a cylindrical-shaped magnetic structure supported from the said end member and encircling the said coil; a permanent magnet fixedly supported within the said coil whereby a stationary magnetic flux field is established; and a winding extending longitudinally of the said cylindrical-shaped magnetic structure and surrounding a wall thereof, said winding adapted to be energized by an A.-C. current whereby a varying magnetic flux field is introduced into the said stationary flux field.

14. The invention as recited in claim 13 including a transformer rigidly mounted with respect to the said cylindrical-shaped magnetic structure, and wherein the said winding constitutes a secondary winding of the said transformer.

15. An instrument mechanism comprising an end member; a shaft rotatably mounted in and extending through the said end member; a cylindrical-shaped magnetic structure supported from the said end member; a structure including a permanent magnet fixedly supported within the said cylindrical-shaped magnetic structure and associated pole pieces having ends spaced therefrom whereby air gaps are formed therebetween; bearings supported by bridge members secured to the said cylindrical-shaped magnetic structure; a coil pivotally mounted between the said bearings and rotatable in the said air gaps, a transformer rigidly supported from the said cylindrical-shaped magnetic structure; a transformer secondary winding extending longitudinally of the said cylindrical-shaped magnetic structure and surrounding a wall thereof and adapted, when energized by an A.-C. current, to produce a varying magnetic flux field across the said air gaps.

References Cited in the file of this patent
UNITED STATES PATENTS

| | | |
|---|---|---|
| 2,602,660 | Shannon | July 8, 1952 |
| 2,680,222 | Schweig | June 1, 1954 |

OTHER REFERENCES

"Servomechanism Practice," Ahrendt, W. R., McGraw-Hill, New York, 1954, page 46.